US010669966B2

(12) United States Patent
Suesada et al.

(10) Patent No.: US 10,669,966 B2
(45) Date of Patent: Jun. 2, 2020

(54) CONTROL DEVICE AND METHOD FOR DIESEL ENGINE

(71) Applicant: Mazda Motor Corporation, Aki-gun, Hiroshima (JP)

(72) Inventors: Kazuma Suesada, Hiroshima (JP); Hiroshi Minamoto, Hiroshima (JP); Yasunori Uesugi, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 9 days.

(21) Appl. No.: 16/156,865

(22) Filed: Oct. 10, 2018

(65) Prior Publication Data

US 2019/0112997 A1    Apr. 18, 2019

(30) Foreign Application Priority Data

Oct. 12, 2017    (JP) .................................. 2017-198454

(51) Int. Cl.
*F02D 41/40* (2006.01)
*F02D 41/00* (2006.01)
(Continued)

(52) U.S. Cl.
CPC ....... *F02D 41/403* (2013.01); *F02D 41/0007* (2013.01); *F02D 41/045* (2013.01);
(Continued)

(58) Field of Classification Search
CPC .. F02D 41/403; F02D 41/0007; F02D 41/045; F02D 41/401; F02D 41/12;
(Continued)

(56) References Cited

U.S. PATENT DOCUMENTS 6,612,292 B2 *  9/2003  Shirakawa ............ F02D 41/403
                                                    123/357
8,175,789 B2 *  5/2012  Kojima ................. F02D 41/403
                                                    701/104
(Continued)

FOREIGN PATENT DOCUMENTS

EP        1221544 A2     7/2002
EP        1531253 A2     5/2005
JP     2013185540 A      9/2013
JP     2015190419 A     11/2015

*Primary Examiner* — Thai Ba Trieu
(74) *Attorney, Agent, or Firm* — Alleman Hall Creasman & Tuttle LLP

(57) ABSTRACT

The silence of a diesel engine is enhanced. A PCM detects an actual supercharging pressure of a gas, and controls an injection mode of a fuel through an injector, thereby executing main injection that is started near a compression top dead center or pilot injection that is executed prior to the main injection depending on an operating state of an engine. If the degree of opening of an accelerator pedal decreases during operation of a large turbocharger, and the actual supercharging pressure is equal to or higher than a predetermined value, the PCM executes cylinder pressure control that allows an interval between a start timing of the pilot injection and a start timing of the main injection to be broader than if the actual supercharging pressure is less than a predetermined value.

10 Claims, 5 Drawing Sheets

(51) Int. Cl.
  *F02D 41/04* (2006.01)
  *F02D 41/12* (2006.01)
  *F02D 41/38* (2006.01)

(52) U.S. Cl.
  CPC ............ *F02D 41/401* (2013.01); *F02D 41/12* (2013.01); *F02D 2041/389* (2013.01); *F02D 2200/024* (2013.01); *F02D 2200/025* (2013.01); *F02D 2200/0406* (2013.01); *F02D 2200/602* (2013.01)

(58) Field of Classification Search
  CPC ......... F02D 2041/389; F02D 2200/024; F02D 2200/025; F02D 2200/0406; F02D 2200/602
  USPC ............. 60/600–601, 605.1, 605.2, 611, 612
  See application file for complete search history.

(56) References Cited

U.S. PATENT DOCUMENTS

| | | | |
|---|---|---|---|
| 10,012,174 B2 * | 7/2018 | Shirahashi | F02D 41/403 |
| 2006/0266033 A1 * | 11/2006 | Negishi | F02D 41/0007 701/103 |
| 2010/0319444 A1 * | 12/2010 | Miyaura | F02D 41/0025 73/114.49 |
| 2013/0233281 A1 | 9/2013 | Morinaga et al. | |
| 2016/0123264 A1 * | 5/2016 | Oyagi | F02D 41/40 701/105 |
| 2016/0305356 A1 * | 10/2016 | Iwata | F02D 41/403 |
| 2016/0341135 A1 * | 11/2016 | Shirahashi | F02D 41/402 |

* cited by examiner

CONTROL DEVICE AND METHOD FOR DIESEL ENGINE

CROSS-REFERENCE TO RELATED APPLICATION

This application claims priority to Japanese Patent Application No. 2017-198454 filed on Oct. 12, 2017, the entire disclosure of which is incorporated by reference herein.

BACKGROUND

The present disclosure relates to a control device and method for a diesel engine.

Japanese Unexamined Patent Publication No. 2013-185540 discloses an example of a control device for a diesel engine. This engine includes a fuel-injector (injector) that is configured to inject fuel into a combustion chamber, and a supercharger (turbocharger) that is configured to supercharge gas to be introduced into the combustion chamber.

The control device according to the above-described Japanese Unexamined Patent Publication No. 2013-185540 controls an injection mode of the fuel through the fuel-injector to execute main injection that allows injected fuel to start combusting from near a compression top dead center, and pilot injection that is performed to cause preliminary combustion (pre-combustion) to preheat the interior of a cylinder before the combustion based on that main injection.

Meanwhile, superchargers including turbochargers may cause a delay in reduction in a supercharging pressure due to inertia of a turbine and other factors, for example, when an attempt is made to reduce the supercharging pressure in accordance with reduction in the degree of opening of an accelerator pedal. In that case, there is a risk of an excessive rise in the cylinder pressure because of a combination of a steep progress in the combustion based on the pilot injection and the combustion based on the main injection.

Thus, the control device according to the above-described Japanese Unexamined Patent Publication No. 2013-185540 retards the start timing of each of the pilot injection and the main injection, thereby slowly progressing the combustion based on each of the injections to reduce the cylinder pressure.

As a result of earnest investigation, the present inventors have prevented excessive rise in a cylinder pressure, and consequently enhanced silence of engines, by an approach different from the technique disclosed in the above-described Japanese Unexamined Patent Publication No. 2013-185540.

It is therefore an object of the present disclosure to enhance silence of an engine using a control device and method for a diesel engine.

SUMMARY

As a result of earnest investigation, the present inventors have discovered that an interval between a start timing of the pilot injection and a start timing of the main injection contributes to a rise in a cylinder pressure, and completed the technique disclosed herein.

Specifically, the present disclosure is directed to a control device of a diesel engine comprising a supercharger, a fuel-injector, and an accelerator opening detector that detects the degree of opening of an accelerator pedal.

The control device for the above-described diesel engine comprises a supercharger: a fuel-injector; an accelerator opening detector that detects a degree of opening of an accelerator pedal; and an actual supercharging pressure detector. Controlling an injection mode of the fuel-injector allows main injection that is started near a compression top dead center and pilot injection that is executed prior to the main injection to be performed depending on an operating state of the diesel engine, and cylinder pressure control is performed, the cylinder pressure control allowing an interval between a start timing of the pilot injection and a start timing of the main injection to be broader if the degree of opening of the accelerator pedal decreases during operation of the supercharger, and an actual supercharging pressure detected with the actual supercharging pressure detector is equal to or higher than a predetermined value, than if the actual supercharging pressure is less than the predetermined value.

The "actual supercharging pressure" as used herein indicates not a target value of the supercharging pressure, but an estimated or detected value of the real supercharging pressure.

In addition, the "main injection" as used herein refers to a fuel injection for causing the main combustion that is started near the compression top dead center. The start timing of the main injection may be closer to a timing near the compression top dead center than the start timings of other fuel injections such as the start timing of the pilot injection.

On the other hand, the "pilot injection" as used herein is a fuel injection for causing preliminary combustion (pre-combustion) to preheat the cylinder before the aforementioned main combustion. Note that the pilot injection may be executed a plurality of times.

In addition, the phrase "if a degree of opening of an accelerator pedal decreases during operation of the supercharger" means "if the degree of opening of an accelerator pedal decreases in an operating region where the supercharger is operated, i.e., a supercharging region". In other words, cases where the cylinder pressure control is executed include both a case where a transition is made from the supercharging region to a non-supercharging region as a result of reduction in the opening of the accelerator pedal in the supercharging region, and a case where the supercharging region continues without transitioning to the non-supercharging region. In the case where a transition is made from the supercharging region to the non-supercharging region, the actual supercharging pressure is equal to a general intake pressure.

In general, once the degree of opening of the accelerator pedal decreases, an engine load shifts from the high-load side to the low-load side. At that time, if the supercharger is being operated, the supercharging pressure would also shift from the high-pressure side to the low-pressure side in accordance with the transition of the engine load. However, as mentioned above, inertia of a turbine and other factors may cause a delay in reduction in a supercharging pressure in superchargers including turbochargers.

In that case, the real supercharging pressure (actual supercharging pressure) will become temporarily higher than the target supercharging pressure corresponding to the engine load, and the aforementioned pilot combustion will steeply progress. If the main injection is performed during such a progress, diffusion combustion based on that main injection would also steeply progress. This may cause an excessive rise in the cylinder pressure.

In contrast, according to the above-described configuration, the above-described control device executes the cylinder pressure control to broaden the interval between the start timing of the pilot injection and the start timing of the main injection if the degree of opening of the accelerator pedal decreases during the supercharging, and the actual supercharging pressure is equal to or higher than the predetermined value.

In this manner, it is possible to make an adjustment such that the diffusion combustion based on the main injection slowly progresses after the pilot combustion starts slowly progressing (for example, after the heat release rate associated with the pilot combustion reaches its peak). This can reduce the cylinder pressure, and consequently enhance the silence of the engine.

In addition, in the above-described cylinder pressure control, the above-described interval may be broadened by retarding the start timing of the above-described main injection compared to the case where the above-described actual supercharging pressure is less than the above-described predetermined value.

To broaden the interval between the start timing of the pilot injection and the start timing of the main injection, the start timing of the pilot injection, for example, may be advanced.

However, if the start timing of the pilot injection is advanced, fuel may be injected before the cylinder temperature is sufficiently raised. In this case, there is a risk of generating unburned fuel due to insufficient atomization of the injected fuel.

In contrast, according to the above-described configuration, the start timing of the main injection is actively retarded rather than changing the start timing of the pilot injection. This can reduce generation of an unburned fuel, and enhance emission performance.

In addition, in the above-described cylinder pressure control, the fuel injection amount in the above-described main injection may be set to be the same amount as that without the above-described cylinder pressure control.

Furthermore, in the above-described cylinder pressure control, the fuel injection amount in the above-described pilot injection may be set to be the same amount as that without the above-described cylinder pressure control.

For example, as described in the above-described Japanese Unexamined Patent Publication No. 2013-185540, if both the start timing of the pilot injection and the start timing of the main injection are retarded, unburned fuel may be generated due to insufficient pre-combustion as a result of shortening the time to premix the fuel supplied by the pilot injection. Thus, in this case, emission performance needs to be secured by decreasing the fuel injection amount in each injection.

In contrast, the above-described configuration allows only the start timing of the main injection to be changed without changing the start timing of the pilot injection. This can secure sufficient time to premix the fuel supplied by the pilot injection as much as possible, and can consequently secure emission performance without reducing the fuel injection amount. This can reduce torque down due to decrease in the fuel injection amount.

In addition, the above-described cylinder pressure control may not be executed even if the above-described actual supercharging pressure is equal to or higher than the above-described predetermined value in a case where the degree of opening of the accelerator pedal decreases during operation of the supercharger, and the fuel injection amount in the above-described pilot injection is less than a predetermined amount.

For example, if the fuel injection amount is relatively small such as that under a low load, the cylinder pressure will become relatively smaller than if the fuel injection amount is relatively large such as that under a high load. In this case, silence of the engine can be secured even without executing the cylinder pressure control.

The control device of the above-described diesel engine does not execute the cylinder pressure control if the fuel injection amount in the pilot injection is less than the predetermined amount. Since the cylinder pressure control is not executed, the control mode of the engine can be made simpler.

In addition, the above-described supercharger may be configured as a turbocharger including a turbine provided in an exhaust passage of the above-described diesel engine and a compressor provided in an intake passage of the above-described diesel engine and configured to rotate in synchronization with the above-described turbine.

The above-described configuration is particularly effective at the time of use of the turbocharger as the supercharger.

Another aspect of the present disclosure is directed to a control method for a diesel engine including a supercharger, a fuel-injector, an accelerator opening detector, and an actual supercharging pressure detector.

The control method of the above-described diesel engine comprises: an accelerator opening detecting step of detecting a degree of opening of an accelerator pedal through the accelerator opening detector; an actual supercharging pressure detecting step of detecting an actual supercharging pressure through the actual supercharging pressure detector; and a fuel injection step of controlling an injection mode of the fuel-injector to execute main injection that is started near a compression top dead center and pilot injection that is executed prior to the main injection depending on an operating state of the diesel engine. In the fuel injection step, cylinder pressure control is performed if the degree of opening of the accelerator pedal decreases during operation of the supercharger, and the actual supercharging pressure is determined to be equal to or higher than a predetermined value, the cylinder pressure control allowing an interval between a start timing of the pilot injection and a start timing of the main injection to be broader than regular control that is executed if the actual supercharging pressure is determined to be less than the predetermined value.

According to the above-described method, the cylinder pressure control is executed to broaden the interval between the start timing of the pilot injection and the start timing of the main injection if the degree of opening of the accelerator pedal decreases in the supercharging region, and the actual supercharging pressure is equal to or higher than the predetermined value.

In this case, it is possible to make an adjustment such that the diffusion combustion based on the main injection slowly progresses after the pilot combustion starts slowly progressing (for example, after the heat release rate associated with the pilot combustion reaches its peak). This can reduce the cylinder pressure, and consequently enhance the silence of the engine.

In addition, in the above-described fuel injection step, the above-described cylinder pressure control may be executed such that the time to premix the fuel supplied by the above-described pilot injection is secured without reducing the fuel injection amount, thereby reducing torque down due to decrease in the fuel injection amount.

As can be seen from the foregoing description, the silence of the engine can be enhanced by the control device and the control method for the above-described diesel engine.

DETAILED DESCRIPTION

Figure 1:
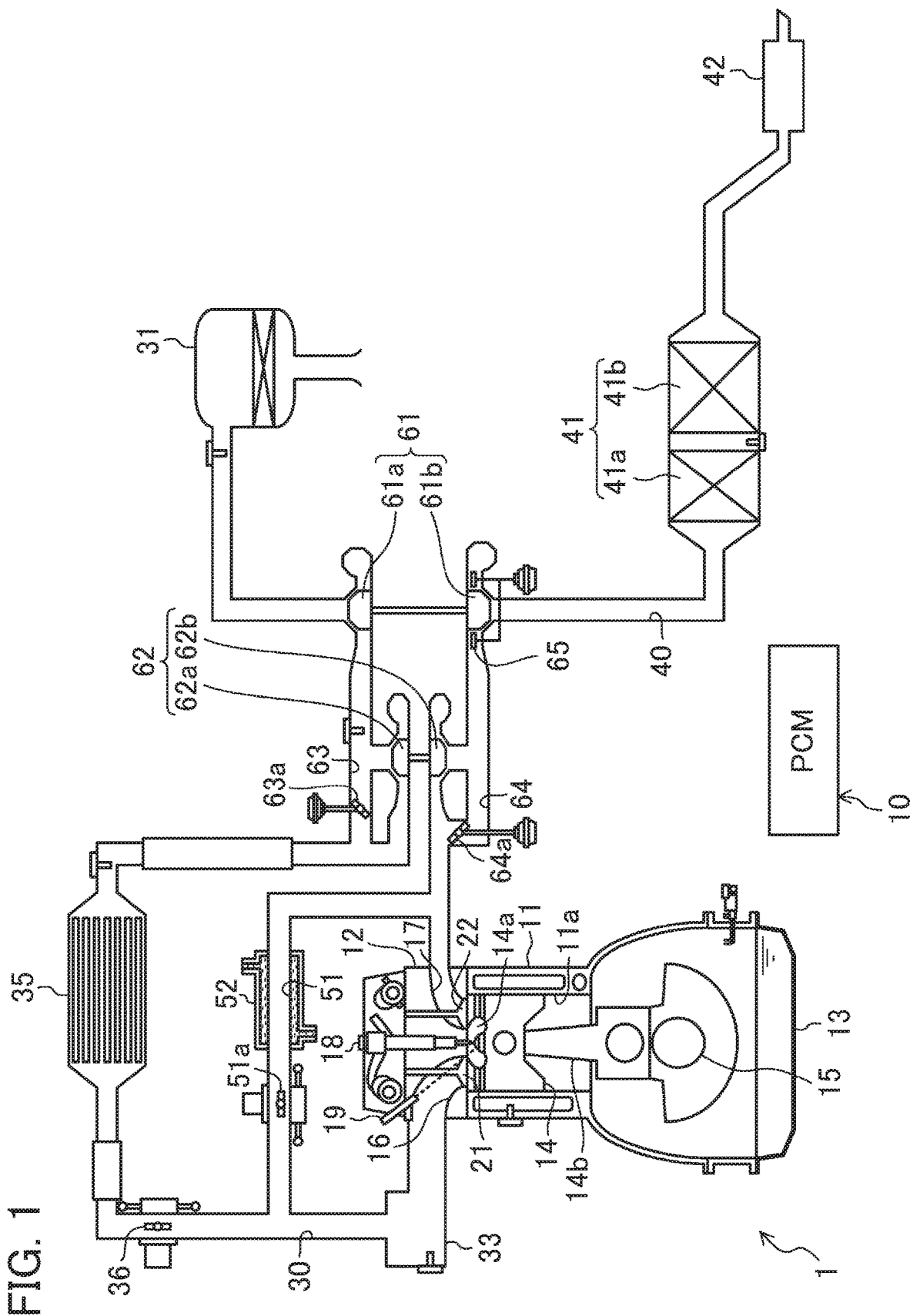
FIG. 1 is a schematic view exemplifying a configuration of a diesel engine.
Figure 2:
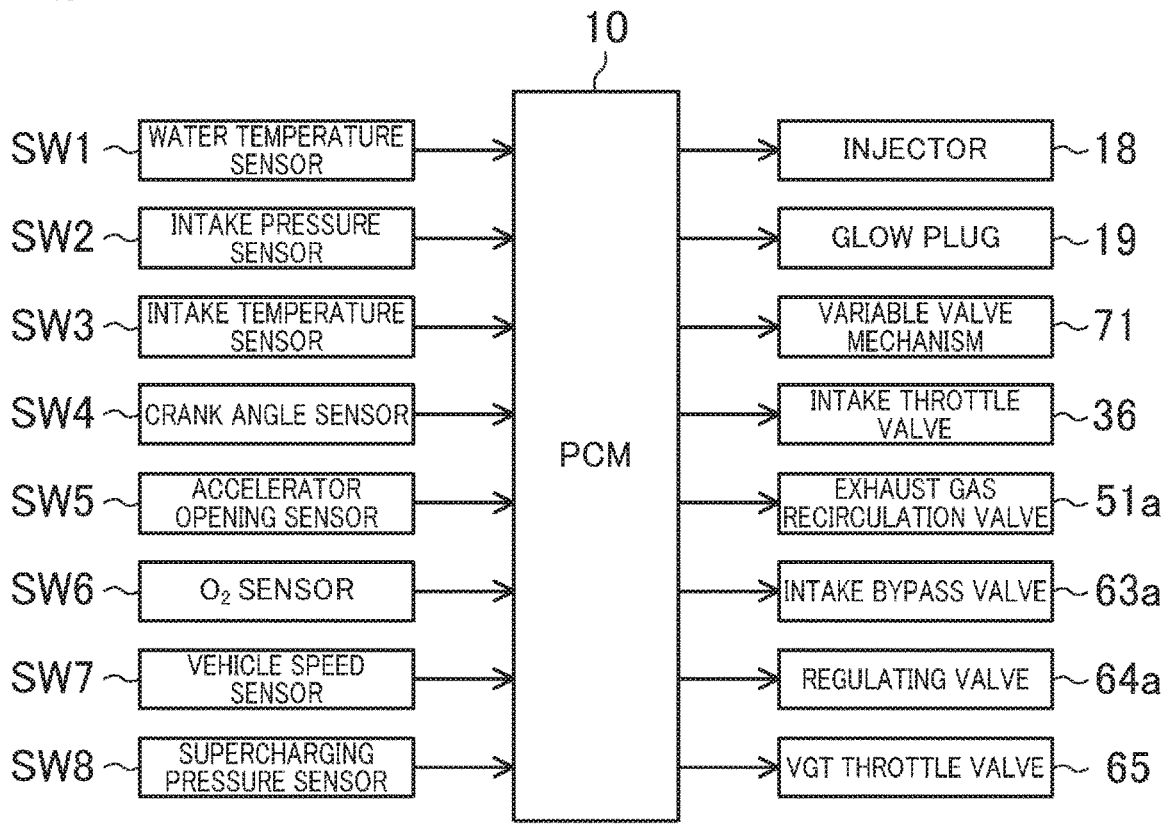
FIG. 2 is a block diagram exemplifying a configuration of a control device for a diesel engine.
Figure 3:
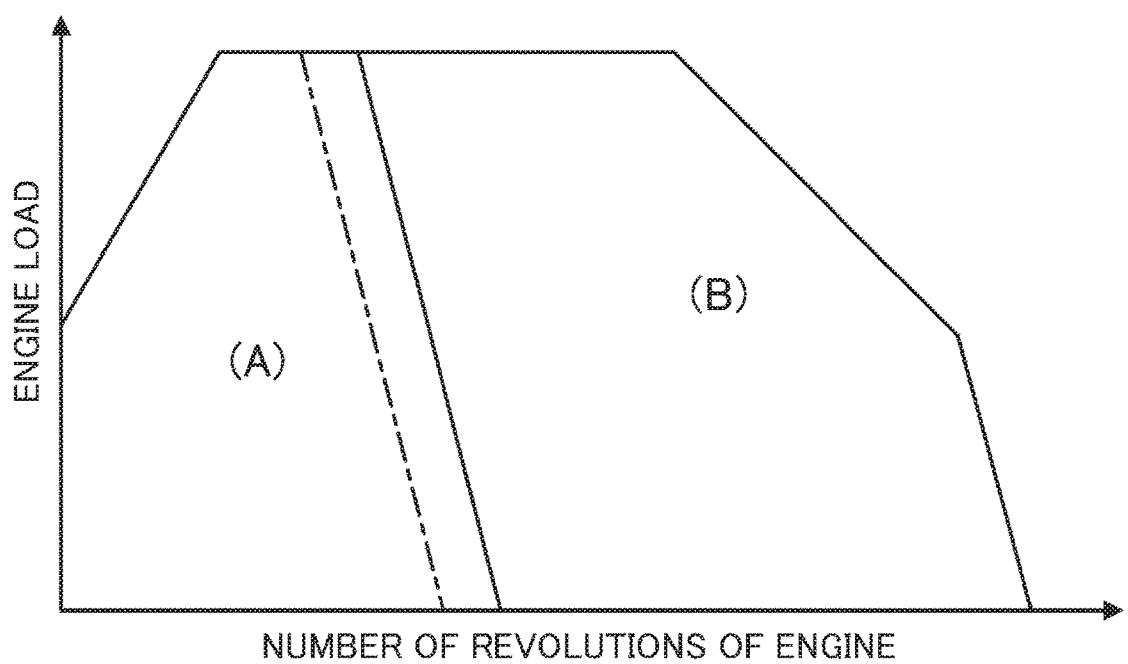
FIG. 3 exemplifies an actuation map of a two-stage turbocharger.

Embodiments of a control device and method for a diesel engine will now be described in detail with reference to the drawings. The following explanations are examples. FIG. 1 is a schematic view exemplifying a configuration of a diesel engine (hereinafter simply referred to as the "engine") 1. FIG. 2 is a block diagram exemplifying a configuration of a control device for the engine 1. FIG. 3 exemplifies an actuation map of a two-stage turbocharger.

Overall Configuration of Engine

The engine 1 is a four-stroke diesel engine that is installed in, for example, a four-wheel vehicle, and is supplied with fuel having light oil as its main component. As illustrated in FIG. 1, the engine 1 is an engine with a two-stage turbocharger comprising a large turbocharger 61 and a small turbocharger 62 that are configured to supercharge gas to be introduced into a combustion chamber 14a.

A crank shaft 15, which is an output shaft of the engine 1, is connected to a drive wheel via a transmission (not shown). The engine 1 operates, so that the engine output is transmitted to the drive wheel, thus driving the vehicle forward.

The engine 1 includes a cylinder block 11 provided with a plurality of cylinders 11a, a cylinder head 12 that is arranged above this cylinder block 11, and an oil pan 13 where lubricating oil is trapped and which is arranged below the cylinder block 11. Only one of the cylinders 11a is illustrated in FIG. 1. A piston 14 is reciprocatably fitted into each of the cylinders 11a of the engine 1. The top surface of the piston 14 has a cavity defining the reentrant combustion chamber 14a. This piston 14 is connected to the crank shaft 15 via a connecting rod 14b.

The cylinder head 12 has an intake port 16 and an exhaust port 17 for each of the cylinders 11a. An intake valve 21 that opens and closes an opening of the combustion chamber 14a is arranged in the intake port 16. Similarly, an exhaust valve 22 that opens and closes another opening of the combustion chamber 14a is arranged in the exhaust port 17.

The engine 1 comprises a variable valve mechanism 71 (see FIG. 2) that allows at least either a valve timing or a valve lift to vary, as a valve mechanism for driving each of the intake valve 21 and the exhaust valve 22. The variable valve mechanism 71 may have any one of various known mechanisms. The engine 1 changes at least either the valve timing or the valve lift of the intake valve 21, and also changes at least either the valve timing or the valve lift of the exhaust valve 22, depending on the operating state.

The cylinder head 12 is provided with an injector 18 that is configured to inject fuel into the combustion chamber 14a, and a glow plug 19 that warms intake air in each of the cylinders 11a during the time during which the engine 1 is cold to enhance ignitability of the fuel. The injector 18 is arranged such that an injection port for injecting fuel starts from the ceiling surface of the combustion chamber 14a to face the combustion chamber 14a. The injector 18 is an example of the "fuel-injector".

The injector 18 is configured so as to be capable of controlling the degree of opening of the injection port in an advanced manner, for example, so that partial injection is performed a plurality of times. As will be mentioned later, a PCM 10 inputs a pulse signal to the injector 18 to control the mode of injecting fuel through the injector 18 (the mode in which the injector 18 injects fuel). The mode of injecting fuel is controlled through the pulse width, input timing, and number of times of input of the pulse signal.

An intake passage 30 is connected to one side of the engine 1. The intake passage 30 communicates with the intake port 16 of each of the cylinders 11a, and introduces fresh air to the combustion chamber 14a of each of the cylinders 11a. On the other hand, an exhaust passage 40 is connected to the other side of the engine 1. The exhaust passage 40 communicates with the exhaust port 17 of each of the cylinders 11a, and exhausts burnt gas (that is, exhaust gas) from the combustion chamber 14a of each of the cylinders 11a. The aforementioned large turbocharger 61 and small turbocharger 62 that are configured to supercharge intake air are arranged in the intake passage 30 and exhaust passage 40.

An upstream end portion of the intake passage 30 is provided with an air cleaner 31 that filters intake air. On the other hand, a surge tank 33 is arranged in the vicinity of a downstream end of the intake passage 30. The intake passage 30 located downstream of the surge tank 33 constitutes independent passages for the respective cylinders 11a. The downstream end of each independent passage is connected to the intake port 16 of an associated one of the cylinders 11a.

A large compressor 61a of the large turbocharger 61, a small compressor 62a of the small turbocharger 62, an intercooler 35 that cools the air compressed by the large compressor 61a and the small compressor 62a, and an intake throttle valve 36 that adjusts the amount of intake air are arranged between the air cleaner 31 and the surge tank 33 in the intake passage 30. The intake throttle valve 36 is basically in its fully open state, but it is brought to its fully closed state at the shutdown of the engine to prevent shock.

An upstream portion of the exhaust passage 40 is configured as an exhaust manifold. The exhaust manifold has a plurality of independent passages corresponding to the cylinders 11a, respectively, and each connected to the outer end of an associated one of the exhaust ports 17, and an assembly in which the plurality of independent passages are assembled.

On the downstream side of the exhaust manifold in the exhaust passage 40, a small turbine 62b of the small turbocharger 62, a large turbine 61b of the large turbocharger 61, an exhaust gas purifier 41 that purifies hazardous components in exhaust gas, and a silencer 42 are arranged in this order from the upstream side.

The exhaust gas purifier 41 includes an oxidation catalyst 41a and a diesel particulate filter (hereinafter referred to as the DPF) 41b. The oxidation catalyst 41a is disposed upstream of the DPF 41b. The oxidation catalyst 41a and the DPF 41b are contained in one case. The oxidation catalyst 41a has an oxidation catalyst supporting platinum, a substance in which palladium is added to platinum, or any other substance, and promotes a reaction of generating $CO_2$ and $H_2O$ by oxidation of CO and HC in exhaust gas. In addition, the DPF 41*b* collects particulates such as soot included in exhaust gas of the engine 1. The DPF 41*b* may be coated with the oxidation catalyst.

An exhaust gas recirculation passage 51 is provided between the intake passage 30 and the exhaust passage 40. The exhaust gas recirculation passage 51 recirculates a portion of exhaust gas to the intake passage 30. The upstream end of the exhaust gas recirculation passage 51 is connected to a portion of the exhaust passage 40 between the exhaust manifold and the small turbine 62*b* (that is, the portion upstream of the small turbine 62*b*). The downstream end of the exhaust gas recirculation passage 51 is connected to a portion of the intake passage 30 between the surge tank 33 and the intake throttle valve 36 (that is, the portion downstream of the small compressor 62*a*). An exhaust gas recirculation valve 51*a* for adjusting the recirculation amount of exhaust gas to the intake passage 30, and an EGR cooler 52 for cooling exhaust gas with engine cooling water are arranged in the exhaust gas recirculation passage 51.

The large turbocharger 61 has the large compressor 61*a* arranged in the intake passage 30 and the large turbine 61*b* arranged in the exhaust passage 40. The large compressor 61*a* and the large turbine 61*b* are connected together, and are configured to rotate in synchronization with each other. The large compressor 61*a* is arranged between the air cleaner 31 and the intercooler 35 in the intake passage 30. On the other hand, the large turbine 61*b* is arranged between the exhaust manifold and the oxidation catalyst 41*a* in the exhaust passage 40.

The small turbocharger 62 has the small compressor 62*a* arranged in the intake passage 30 and the small turbine 62*b* arranged in the exhaust passage 40. The small compressor 62*a* and the small turbine 62*b* are connected together, and are configured to rotate in synchronization with each other. The small compressor 62*a* is arranged downstream of the large compressor 61*a* in the intake passage 30. On the other hand, the small turbine 62*b* is arranged upstream of the large turbine 61*b* in the exhaust passage 40.

More specifically, in the intake passage 30, the large compressor 61*a* and the small compressor 62*a* are arranged in series in this order from the upstream side. In contrast, in the exhaust passage 40, the small turbine 62*b* and the large turbine 61*b* are arranged in series in this order from the upstream side.

Due to rotations of the large turbine 61*b* and the small turbine 62*b* by an exhaust gas flow, each of the large compressor 61*a* and the small compressor 62*a* rotates, thereby compressing intake air.

In this regard, the small turbocharger 62 is relatively small, and the large size turbocharger 61 is relatively large. More specifically, the large turbine 61*b* of the large turbocharger 61 has higher inertia than the small turbine 62*b* of the small turbocharger 62.

An intake bypass passage 63 that bypasses the small compressor 62*a* is connected to the intake passage 30. An intake bypass valve 63*a* is arranged in the intake bypass passage 63. The intake bypass valve 63*a* adjusts the quantity of air flowing through the intake bypass passage 63. The intake bypass valve 63*a* is brought to its fully closed state when not energized (normally closed).

An exhaust bypass passage 64 that bypasses the small turbine 62*b* is connected to the exhaust passage 40. A regulating valve 64*a* for adjusting the amount of exhaust gas flowing through the exhaust bypass passage 64 is arranged in the exhaust bypass passage 64. The regulating valve 64*a* is brought to its fully open state when not energized (normally open).

A VGT throttle valve 65 is arranged at the inlet of the large turbine 61*b*, that is, a portion of the exhaust passage 40 immediately upstream of the large turbine 61*b*. Although not shown in detail, the VGT throttle valve 65 includes a plurality of nozzle vanes that are turnable around the support shaft, and is configured to change the degree of opening of each nozzle vane to change the flow passage cross sectional area of exhaust gas. For example, if the number of revolutions of the engine 1 is small, the flow rate of exhaust gas flowing into the turbine cascade can be increased by reducing the degree of opening of each of the nozzle vanes to a low degree, and the supercharge efficiency can be increased by causing the flow direction to correspond to the tangential direction (that is, the circumferential direction) of the turbine 61*b*.

In addition, the engine 1 is configured to have a relatively low compression ratio, wherein the geometrical compression ratio is 12 or higher and 15 or lower. The engine 1 intends to improve the exhaust emission performance and thermal efficiency by reducing the compression ratio.

(Configuration of Control Device of Engine)

The engine 1 configured as mentioned above is controlled by a powertrain control module (hereinafter referred to as the PCM) 10. The PCM 10 is configured as a microprocessor including a CPU, a memory, a counter/timer group, an interface, and a path that connects these units together. This PCM 10 constitutes the control device.

As illustrated in FIG. 2, detection signals of various sensors are input to the PCM 10. Examples of the various sensors include a water temperature sensor SW1 that detects the temperature of engine cooling water, an intake pressure sensor SW2 that detects the pressure of intake air, an intake temperature sensor SW3 that detects the temperature of intake air, a crank angle sensor SW4 that detects the rotation angle of the crank shaft 15, an accelerator opening sensor SW5 that detects the degree of opening of an accelerator corresponding to the amount of operation of an accelerator pedal (not illustrated) of a vehicle, an $O_2$ sensor SW6 that detects the oxygen concentration in exhaust gas, a vehicle speed sensor SW7 that detects the vehicle speed, and a supercharging pressure sensor SW8 that is attached to the surge tank 33 and detects the pressure of air supplied to the combustion chamber 14*a*. Note that the accelerator opening sensor SW5 is an example of the "accelerator opening detector".

The PCM 10 performs various calculations based on detection signals of these sensors SW1 to SW8 to determine the state of the engine 1 or vehicle, and outputs control signals to actuators of the injector 18, the glow plug 19, the variable valve mechanism 71, the intake throttle valve 36, the exhaust gas recirculation valve 51*a*, the intake bypass valve 63*a*, the regulating valve 64*a*, and the VGT throttle valve 65, respectively.

For example, the PCM 10 detects the supercharging pressure at the present time (hereinafter referred to as the "actual supercharging pressure") based on the detection signal of the supercharging pressure sensor SW8. The PCM 10 functions as the actual supercharging pressure detector, because the PCM 10 is configured to detect the supercharging pressure of intake air (gas).

On the other hand, the PCM 10 determines the state of the engine 1 or vehicle from other sensors, and computes a target value of the supercharging pressure (hereinafter referred to as the "target supercharging pressure") based on that determination result. Furthermore, the PCM 10 adjusts the degrees of opening of the intake bypass valve 63*a*, the regulating valve 64a, and the VGT throttle valve 65 such that the actual supercharging pressure is equal to the target supercharging pressure.

In this manner, the PCM 10 controls operation of the large turbocharger 61 and the small turbocharger 62 through the intake bypass valve 63a, the regulating valve 64a, and the VGT throttle valve 65.

In addition, the PCM 10 is configured to use an operating region A (hereinafter referred to as the "first turbo region") in which the small turbocharger 62 mainly operates and an operating region B (hereinafter referred to as the "second turbo region") in which the large turbocharger 61 mainly operates for different purposes when the engine 1 is operated.

More particularly, as shown in an exemplary operation map in FIG. 3, the PCM 10 reduces the gas flow through the intake bypass passage 63 and the exhaust bypass passage 64 by allowing the intake bypass valve 63a and the regulating valve 64a to have a degree of opening other than the highest degree of opening in the first turbo region A, where the number of revolutions of the engine is lower than that on the switching line indicated by the solid line. This allows a large portion of intake air to pass through the small compressor 62a on the intake side, while allowing a large portion of exhaust gas to pass through the small turbine 62b on the exhaust side. As a result, the small turbocharger 62 mainly operates.

On the other hand, since the small turbocharger 62 serves as an exhaust resistance in the second turbo region B, where the number of revolutions of the engine is higher than that on the switching line in FIG. 3, the intake bypass valve 63a and the regulating valve 64a are determined to have a degree of opening close to their respective highest degrees to promote the gas flow through the intake bypass passage 63 and the exhaust bypass passage 64. This allows a large portion of intake air to bypass the small compressor 62a on the intake side, while allowing a large portion of exhaust gas to bypass the small turbine 62b on the exhaust side. As a result, the large turbocharger 61 mainly operates.

Note that the dot-dash line in FIG. 3 indicates a line at which the regulating valve 64a starts opening. The switching line indicated by the solid line is a line at which the regulating valve 64a is fully opened. Accordingly, the regulating valve 64a is set to have an intermediate degree of opening between the dot-dash line and the solid line. The VGT throttle valve 65 is set to be slightly open to prevent excessive supercharging while the number of revolutions of the engine is high and a high load is applied to the engine.

(Fuel Injection Control of Engine)

The basic control of the engine 1 by the PCM 10 allows determination of a target torque based on the degree of opening of the accelerator, the vehicle speed, and the gear position of the transmission, and allows the injector 18 to inject fuel in accordance with the target torque. The PCM 10 also controls the recirculation ratio of exhaust into the cylinders 11a by controlling the degree of opening of the intake throttle valve 36 or exhaust gas recirculation valve 51a (that is, external EGR control) and/or controlling the variable valve mechanism 71 (that is, internal EGR control).

Figure 4:
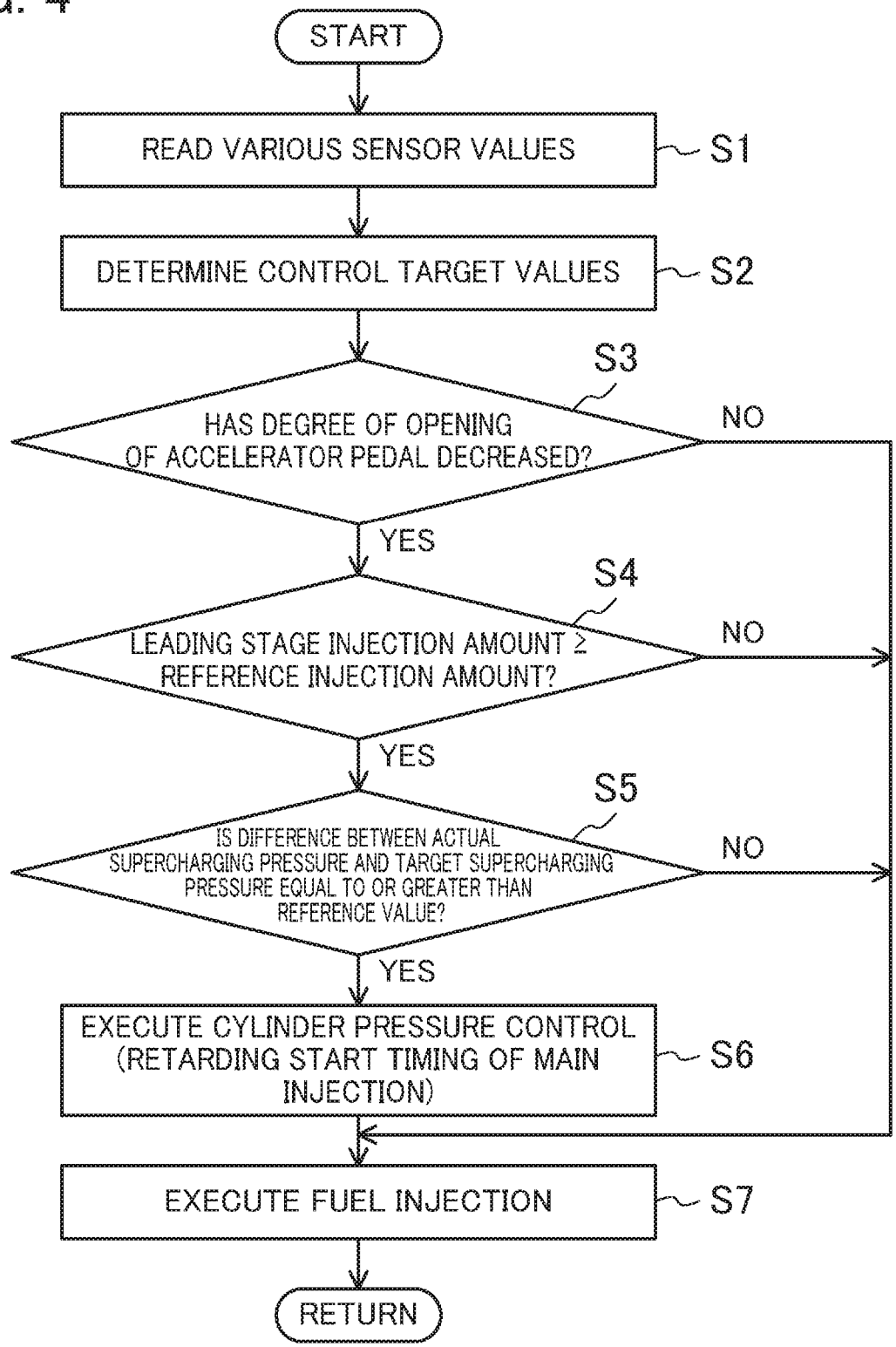
FIG. 4 is a flow chart exemplifying a control procedure for a fuel injection.
Figure 5A:
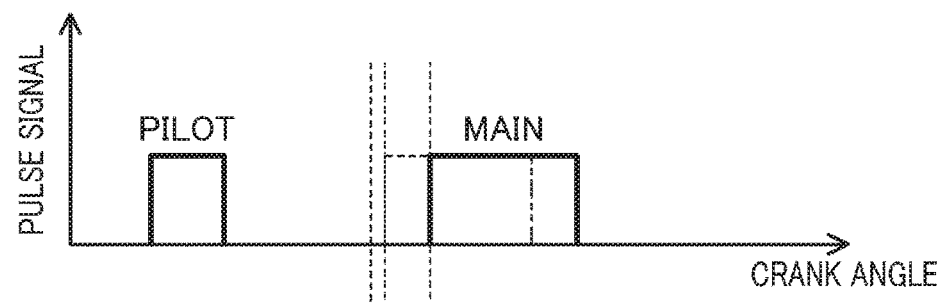
FIG. 5A exemplifies a pulse signal to be input to an injector by a PCM.
Figure 5B:
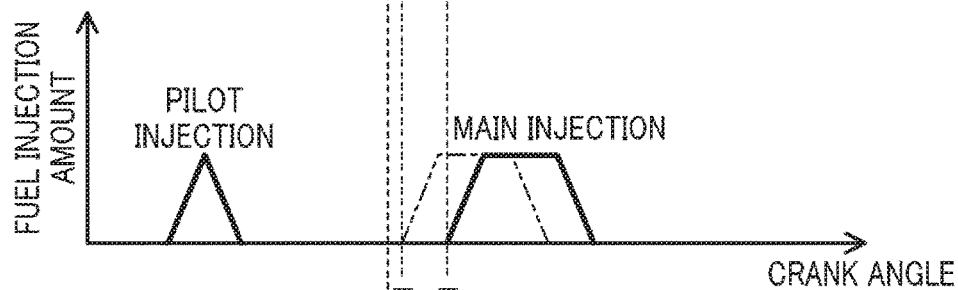
FIG. 5B exemplifies an injection mode of fuel corresponding to the pulse signal.

In this regard, the specific contents of the fuel injection control performed by the PCM 10 during the operation of the engine 1 will be described in detail with reference to FIGS. 4 and 5. FIG. 4 is a flow chart exemplifying a control procedure of a fuel injection. FIG. 5A exemplifies a pulse signal to be input to the injector 18 by the PCM 10; FIG. 5B exemplifies an injection mode of fuel corresponding to the pulse signal; and FIG. 5C exemplifies a history of a heat release rate associated with the injection mode.

The solid lines shown in FIGS. 5A to 5C exemplify the pulse signal, the injection mode of the fuel, and the heat release rate obtained when the cylinder pressure control that will be mentioned later is performed. The chain double-dashed lines in said the same figures exemplify the pulse signal, the injection mode of the fuel, and the heat release rate under the same conditions (for example, in the same operating environment with the same number of revolutions and the same load) except that the cylinder pressure control is not performed Once the process shown in FIG. 4 starts, the PCM 10 executes the process of reading various sensor values (Step S1). Specifically, the PCM 10 reads the detection signals of the sensors SW1 to SW8, and detects information such as the cooling water temperature, the intake air amount, the intake air pressure, the intake air temperature, the number of revolutions of the engine, the degree of opening of the accelerator, and the actual supercharging pressure of the engine 1 based on those signals. This Step S1 exemplifies the "accelerator opening detection step", because in this step, the degree of opening of the accelerator is detected through the accelerator opening sensor SW5. Similarly, Step S1 also exemplifies the "actual supercharging pressure detection step," because in this step, the actual supercharging pressure is detected.

In the following Step S2, the PCM 10 determines control target values related to the fuel injection such as the fuel injection amount from the injector 18 and the start timing of the fuel injection based on various pieces of information detected in Step S1. The injector 18 may inject fuel a plurality of times during one combustion cycle. In Step S2, the injection pattern of the fuel is also determined, and the control target value is determined for each fuel injection.

Figure 6:
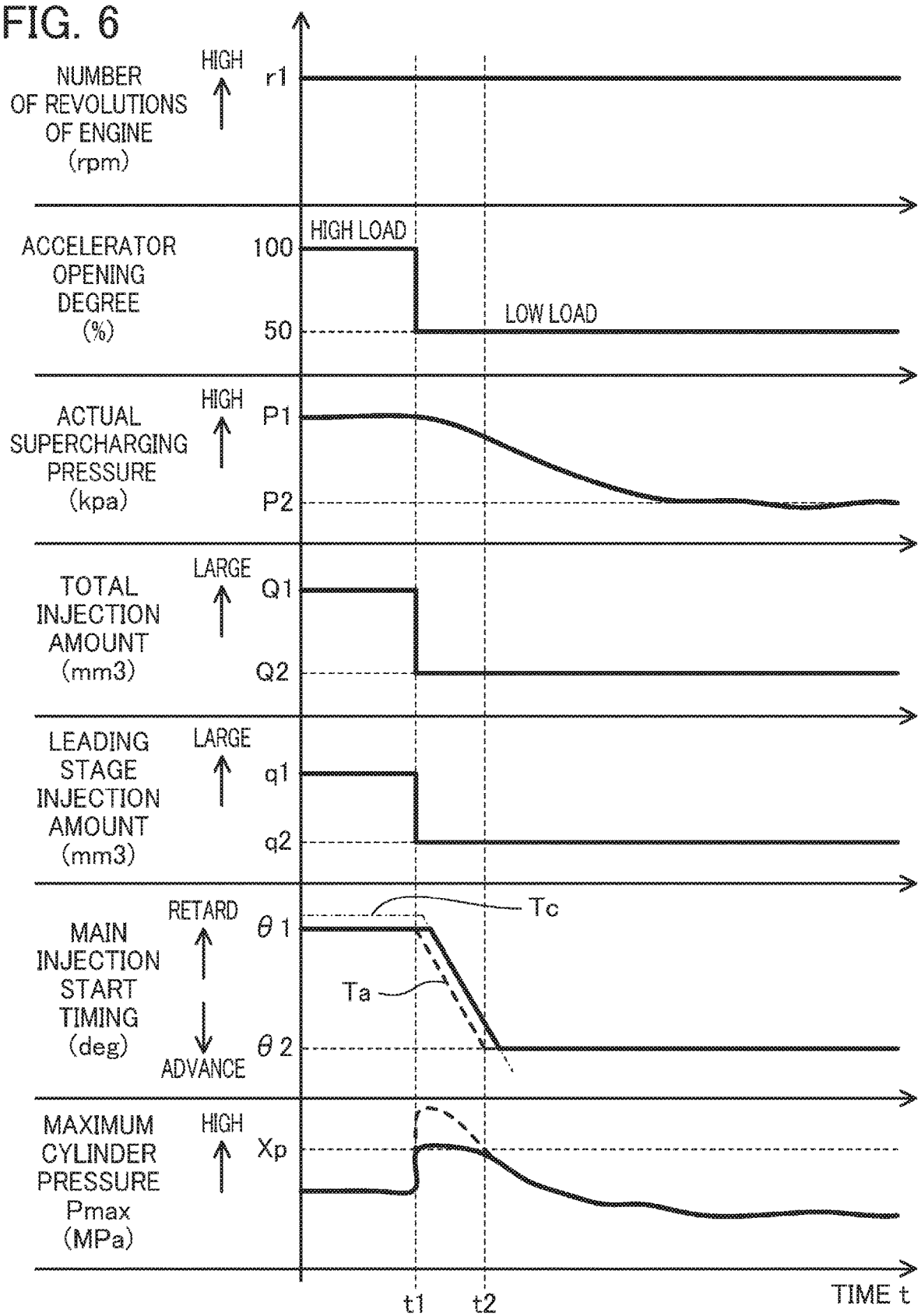
FIG. 6 is a time chart showing a specific example of cylinder pressure control.

The injection pattern in Step S2 as used herein indicates how many times the total amount of fuel injected (total injection amount) per one combustion cycle is injected and at what ratio these fuel injections are performed. Specifically, in this configuration example, as schematically shown in FIG. 6, at least two fuel injections called the pilot injection and the main injection are executed in many operating regions. The main injection means that fuel is injected in front of or in the vicinity of the compression top dead center such that the injected fuel starts combusting from near the compression top dead center. The pilot injection means that a small amount of fuel is injected before the main injection to cause preliminary combustion (pre-combustion) before combustion based on the main injection (main combustion). An additional fuel injection called an after injection may be performed after the main injection, or a pre-injection for inhibiting an ignition delay in the main injection may be performed between the pilot injection and the main injection, depending on the operating region.

In addition, what is determined to determine the injection pattern in Step S2 is, for example, whether the fuel injection corresponds to only one pilot injection, two injections including the pilot injection and the main injection, or three injections further including the after injection. Further, if fuel is injected a plurality of times, the ratio at which the amount of fuel injected is divided is also determined.

Furthermore, the PCM 10 stores a map corresponding to the information read in Step S1 as the start timing of the fuel injection, and the PCM 10 determines the start timing of each injection based on that map. In particular, the PCM 10 employs a basic timing Ta reflecting target torque, fuel consumption, emission performance, and other factors, as the basic start timing of the main injection. This basic timing Ta is employed as the start timing of the main injection at least during the steady operation of the engine 1. Unless otherwise specified, the start timing refers to the start timing of the main injection in the following description.

Under the condition that the rotational speed of the engine is the same, the basic timing Ta is set to be later on the higher load side where the fuel injection amount is larger. As the load increases, the basic timing Ta is retarded in order to prevent the pressure within the cylinders 11a (hereinafter referred to as the "cylinder pressure") from being excessively high, and to obtain required combustion energy in the high load range where high torque is required. Although the basic timings Ta set when the engine operates at different rotational speeds are different in details, the basis timing Ta similarly tends to be retarded on the higher load side. In other words, the basic timing is advanced when the load transits from the high load side to the low load side such as when the degree of opening of the accelerator pedal decreases.

The PCM 10 generates an injection instruction pulse to be input to the injector 18 based on the control target value set in Step S2. As shown in Step S7 that will be mentioned later, the injector 18 that has received the injection instruction pulse injects fuel into the combustion chamber 14a.

More particularly, as shown in FIG. 5A, for example, the PCM 10 inputs a pulse signal (injection instruction pulse) having a predetermined pulse width to the injector 18 at a predetermined timing.

As shown in FIG. 5B, the injector 18 injects fuel in accordance with the waveform of the input pulse signal. The input timing of the pulse signal defines the start timing of the fuel injection, and the fuel injection amount per injection increases as the pulse width of the pulse signal increases. In addition, in a case where a plurality of fuel injections are executed per combustion cycle, the PCM 10 inputs a plurality of pulse signals to the injector 18. In the example shown in FIG. 5, the PCM 10 executes each of the pilot injection and the main injection once through the injector 18.

In this manner, the PCM 10 controls the injection mode of the fuel in the injector 18 to execute the pilot injection, which includes fuel injections at the leading stage, or the main injection, which is started near the compression top dead center, depending on the operating state of the engine 1.

Meanwhile, in general, once the degree of opening of the accelerator pedal is reduced, the engine load shifts from the high load side to the low load side. At that time, the supercharging pressure also shifts from the high pressure side to the low pressure side in accordance with the shift of the engine load.

However, superchargers including the large turbocharger 61 may cause a delay in reduction in an actual supercharging pressure due to inertia and other factors of a turbine, for example, when an attempt is made to reduce the supercharging pressure in accordance with reduction in the degree of opening of an accelerator pedal.

In particular, the large turbine 61b of the large turbocharger 61 has a relatively larger size and a larger mass than the small turbine 62b of the small turbocharger 62. Thus, for example, when the engine load is sharply decreased, the actual supercharging pressure is temporarily much higher than the target supercharging pressure corresponding to the engine load due to a delay in reduction in the number of revolutions of the large size turbine 61b. This may cause combustion based on the pilot injection (pilot combustion) to steeply progress. In this case, if the main injection is performed during the progress of the pilot combustion, the diffusion combustion based on that main injection may also steeply progress. This may cause the cylinder pressure to excessively rise. An excessive rise in the cylinder pressure is undesirable to enhance silence of the engine 1.

Thus, if the degree of opening of the accelerator pedal decreases during supercharging, and the actual supercharging pressure is equal to or higher than the predetermined value, the PCM 10 executes the cylinder pressure control that broadens the interval between the start timing of the pilot injection and the start timing of the main injection than if the actual supercharging pressure is less than the predetermined value.

A process related to the cylinder pressure control will be described in detail.

When the degree of opening of the accelerator pedal decreases during supercharging, the PCM 10 determines, in steps S3 through S5, whether the actual supercharging pressure is equal to or higher than the predetermined value, and determines the possibility of excessive rise in the cylinder pressure based on that determination.

Specifically, in Step S3 following Step S2, the PCM 10 determines whether the degree of opening of the accelerator pedal has decreased when the operating state of the engine 1 is in the second turbo region B, based on various pieces of information including the degree of opening of the accelerator opening detected in Step S1.

When the amount by which the degree of opening of the accelerator decreases falls within a predetermined reference range, the PCM 10 determines that the degree of opening of the accelerator pedal has not decreased (Step S3: NO), and The process skips Step S4 to Step S6, and proceeds to Skip S7. The reference range herein is at least set to be equal to or greater than the amount of free play of the accelerator pedal. The PCM 10 allows the process to proceed from Step S3 to Step S7 also when the operating state of the engine 1 is not in the second turbo region B but in the first turbo region A.

In Step S7, the injector 18 injects the fuel into the combustion chamber 14a based on the control target value determined in Step S2. More specifically, the injection operation of the injector 18 is controlled as usual such that the timing when the injector 18 starts injecting the fuel matches the aforementioned basic timing Ta. As a result, combustion as indicated by the chain double-dashed curve in FIG. 5C occurs in the combustion chamber 14a. The heat release rate shown in FIG. 5C indicates heat production (J/deg) per unit crank angle. Steps S3 to S7 exemplify the "fuel injection step".

On the other hand, when the operating state of the engine 1 is in the second turbo region B, and the amount by which the degree of opening of the accelerator pedal decreases falls outside the aforementioned reference range, the PCM 10 determines that the degree of opening of the accelerator pedal has decreased (Step S3: YES), and the process proceeds from Step S3 to Step S4.

In Step S4, the PCM 10 determines whether or not the fuel injection amount in the pilot injection (the leading stage injection amount) is equal to or greater than a reference injection amount. The leading stage injection amount is estimated based on, for example, the pulse width of the pulse signal input to the injector 18 from the PCM 10. If the leading stage injection amount is equal to or greater than the reference injection amount (Step S4: YES), the process proceeds to step S5, in which a further determination is made. If the leading stage injection amount is less than the reference injection amount (Step S4: NO), the process proceeds to Step S7, and the aforementioned process is executed.

In Step S5, the PCM 10 determines whether or not the actual supercharging pressure of the engine 1 is equal to or higher than the predetermined value. This Step S5 is equivalent to determining the degree of a delay in reduction in the actual supercharging pressure. Specifically, the PCM 10 computes a difference obtained by subtracting the target supercharging pressure serving as the aforementioned predetermined value from the actual supercharging pressure of the engine 1 (that is, the size of the gap between the target supercharging pressure and the actual supercharging pressure), and determines whether or not that difference is equal to or greater than the predetermined reference value. When the difference obtained by subtracting the target supercharging pressure from the actual supercharging pressure is equal to or greater than the reference value, the PCM 10 determines that the actual supercharging pressure is equal to or greater than the predetermined value (that is, in a state where reduction in the actual supercharging pressure is retarded, and a gap from the target supercharging pressure is large) (Step S5: YES), and the process proceeds to Step S6. On the other hand, when the difference is less than the reference value, the PCM 10 determines that the actual supercharging pressure is less than the predetermined value (that is, there is no delay in reduction in the actual supercharging pressure, or even if there is a delay, the actual supercharging pressure is within an allowable range from the viewpoint of combustion noise) (Step S5: NO), and the process proceeds to Step S7.

If the determinations from Step S3 to Step S5 are all YES, the PCM 10 determines that the cylinder pressure may excessively rise, and executes the cylinder pressure control in Step S6.

Specifically, in Step S6, the PCM 10 retards the start timing of the main injection as compared to when no cylinder pressure control is performed (when usual control described below is performed). More specifically, the PCM 10 retards the basic timing Ta determined in Step S2, and changes the basic timing Ta to a predetermined retarding timing Tc. The retarding timing Tc is set to be, for example, a value obtained by retarding the basic timing Ta by about a number deg. Here, as can be seen from each of FIGS. 5A to 5C, the fuel injection amount in the main injection, and the start timing and the fuel injection amount in the pilot injection are kept the same as those in the case where the cylinder pressure control is not performed.

Furthermore, in Step S7 following Step S6, the PCM 10 executes a fuel injection that reflects the process of the cylinder pressure control, and returns.

Figure 5C:
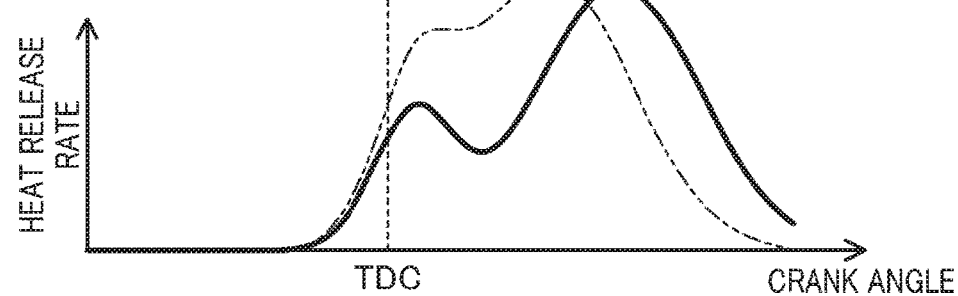
FIG. 5C exemplifies a history of a heat release rate associated with the injection mode.

As shown in FIG. 5C, the cylinder pressure control retards the start timing of the main injection. Thus, even if the heat release rate associated with the pilot combustion more steeply rises than usual, the main injection can be executed after that heat release rate has reached its peak. This can substantially prevent the cylinder pressure from rising when the diffusion combustion based on the main injection occurs. This can substantially prevent the cylinder pressure from excessively rising, and can consequently enhance the silence of the engine 1.

If the determination in any one of Steps S3 to S5 is "NO," the control process skips Step S6, and proceeds to Step S7. In this case, the PCM 10 executes regular injection control (regular control) that does not broaden the interval between the start timing of the pilot injection and the start timing of the main injection, and returns after executing the fuel injection in Step S7. Specifically, if the regular control is executed, the start timing of the main injection will be kept at the basic timing Ta shown in FIGS. 5A to 5C.

(Specific Example of Fuel Injection Control)

FIG. 6 is a time chart showing a specific example of the cylinder pressure control. Specifically, the example shown in FIG. 6 indicates changes in various state amounts (the actual supercharging pressure, the total injection amount, the leading stage injection amount, the start timing of the main injection, and the maximum cylinder pressure) when the degree of opening of the accelerator is sharply decreased while the number of revolutions of the engine is substantially constant.

As shown in FIG. 6, the engine 1 is steadily operated in the high load state where the degree of opening of the accelerator is 100% until time t1 is reached, and the degree of opening of the accelerator sharply decreases from 100% to 50% at the time t1. In the period subsequent to the time t1, the engine 1 is in steady operation while maintaining the low load where the degree of opening of the accelerator is 50%. In addition, irrespective of before or after the time t1, the number of revolutions of the engine is kept substantially constant at a predetermined number of revolutions r1. The operating state of the engine 1 is within the aforementioned second turbo region B, and the large turbocharger 61 is mainly operated.

As shown in FIG. 6, in a period before the time t1, the actual supercharging pressure is set to be a value P1, the total injection amount of the fuel is set to be a value Q1, the leading stage injection amount injected in the pilot injection is set to be a value q1, and the injection timing (the start timing of the main injection) is set to be a value θ1.

More particularly, in the period before the time t1, the actual supercharging pressure substantially matches the target supercharging pressure P1 that is set depending on the operating state where the degree of opening of the accelerator is 100% and the number of revolutions of the engine is r1.

In addition, the total injection amount Q1, the leading stage injection amount q1, and the injection timing θ1 are determined to be the total injection amount, the leading stage injection amount, and the injection timing, respectively, according to the operating state where the degree of opening of the accelerator is 100% and the number of revolutions of the engine is r1. Thus, the injection timing θ1 matches the basic timing Ta that corresponds to the high load where the degree of opening of the accelerator is 100%, and the regular injection control is performed at this point.

Further, the degree of opening of the accelerator sharply decreasing from 100% to 50% from the time t1 to time t2 causes the total injection amount to sharply decrease from Q1 to Q2, and causes the leading stage injection amount to sharply decrease from q1 to q2. Furthermore, the actual supercharging pressure starts decreasing toward a target supercharging pressure P2 that is reset depending on the operating state where the degree of opening of the accelerator is 50% and the number of revolutions of the engine is r1.

As described above, the injection timing is advanced when a transition occurs from the high load side to the low load side. Thus, if the injection amount of the fuel sharply decreases in this manner, the injection timing of the fuel should be sharply advanced to the timing θ2 shown in FIG. 6. In other words, if the total injection amount sharply decreases to Q2 in response to the degree of opening of the accelerator of 50%, the injection timing will be sharply advanced to the θ2 along the broken line indicating the transition of the basic timing Ta in response to the sharp decrease in the injection amount.

However, as described above, after the time t1, the actual supercharging pressure will gradually decrease due to inertia of the large turbine 61b in the large turbocharger 61. As a result, the actual supercharging pressure will temporarily continue to be higher than the target supercharging pressure P2. Moreover, if a leading stage injection amount q2 corresponding to the operating state in which the degree of opening of the accelerator is 50% and the number of revolutions of the engine is r1 is relatively higher than the aforementioned reference injection amount, the maximum cylinder pressure Pmax may exceed a tolerance Xp that is indicated by the broken line.

Thus, the PCM 10 executes the cylinder pressure control. This allows the injection timing to be advanced in accordance with the retarding timing Tc at which the basic timing Ta is slightly retarded from the time t1 to the time t2, as indicated by the waveform of the solid line. Thus, the maximum cylinder pressure Pmax does not exceed the tolerance Xp.

CONCLUSION

As described above, the PCM 10 executes the cylinder pressure control shown in Step S6 in FIG. 4 to broaden the interval between the start timing of the pilot injection and the start timing of the main injection, if the degree of opening of the accelerator pedal decreases during supercharging, and the actual supercharging pressure is equal to or higher than the predetermined value.

In this manner, as shown by the solid line in FIG. 5C, it is possible to make an adjustment such that the diffusion combustion based on the main injection slowly progresses after the heat release rate associated with the pilot combustion has reached its peak. This can reduce the cylinder pressure, particularly the maximum cylinder pressure Pmax, to less than the tolerance Xp, and can thus enhance the silence of the engine 1 as illustrated in FIG. 6.

To broaden the interval between the start timing of the pilot injection and the start timing of the main injection, for example, the start timing of the pilot injection may be advanced.

However, if the start timing of the pilot injection is advanced, the fuel may be injected before the cylinder temperature is sufficiently raised. In this case, there is a risk of generating unburned fuel due to insufficient atomization of the injected fuel.

In contrast, as shown in Step S6 in FIG. 4, the PCM 10 actively retards the start timing of the main injection rather than the start timing of the pilot injection. This can reduce generation of unburned fuel and enhance emission performance.

In addition, for example, in a case where both the start timing of the pilot injection and the start timing of the main injection are retarded, unburned fuel may be generated due to occurrence of insufficient pre-combustion as a result of shortening the time during which the fuel supplied by the pilot injection is premixed. Thus, in this case, the amount of fuel for each injection needs to be reduced to secure emission performance.

In contrast, according to the cylinder pressure control in the present embodiment, for example, it is possible to change only the start timing of the main injection without changing the start timing of the pilot injection. This can provide a sufficient amount of the time during which the fuel supplied by the pilot injection is premixed as much as possible, and consequently emission performance can be secured without reducing the fuel injection amount. This can reduce torque down arising from decrease in the fuel injection amount.

In addition, if the fuel injection amount is relatively small such as that under a low load, the cylinder pressure will be relatively smaller than if the fuel injection amount is relatively large such as that under a high load. In this case, the silence of the engine 1 can be secured even without executing the cylinder pressure control.

Thus, as shown in Step S4 in FIG. 4, the PCM 10 does not execute the cylinder pressure control regardless of the magnitude of the actual supercharging pressure if the leading stage injection amount is less than the reference injection amount. In this case, since the process skips Steps S5 and S6, and proceeds to Step S7, the cylinder pressure control is not executed even if the difference between the actual supercharging pressure and the target supercharging pressure is equal to or greater than the above-described reference value. Since the cylinder pressure control is not executed, the control mode of the engine 1 can be made simpler.

In addition, if a turbocharger is used as a supercharger (in particular, if the large turbocharger 61 and the small turbocharger 62 are used in combination, the cylinder pressure control executed by the PCM 10 becomes particularly effective.

Other Embodiments

In the foregoing embodiment, the control procedure based on the flow chart shown in FIG. 4 has been described. However, appropriate modifications may be made to the control procedure. For example, the order of processes from Step S3 to Step S5 can be appropriately changed.

In the foregoing embodiment, the determination based on the difference obtained by subtracting the target supercharging pressure from the actual supercharging pressure as shown in Step S3 in FIG. 4 has been described. However, such a configuration is merely an example of the present invention. For example, a determination can be made based on an absolute value of the actual supercharging pressure.

Further, in the foregoing embodiment, the control procedure in the second turbo region B has been described. However, such a configuration is merely an example of the present invention. For example, when a transition is made from the supercharging region to the non-supercharging region, the cylinder pressure control can be performed. In this case, the supercharger does not have to be the turbocharger, and may be a mechanical or electric supercharger.

Furthermore, in the foregoing embodiment, the actual supercharging pressure is detected by the supercharging pressure sensor SW8. However, such a configuration is merely an example of the present invention. For example, estimation can be made by a model calculation based on the operating state of the engine 1.

Moreover, although the above-described embodiment exemplified the injection mode of the fuel illustrated in FIG. 5, the present invention is not limited thereto. As mentioned above, a pre-injection can be performed between the pilot injection and the main injection. In the case where the pre-injection is performed, the fuel injection amount in that pre-injection only needs to be set to smaller quantity than the fuel injection amount in the main injection.

The invention claimed is:
1. A control method for controlling a diesel engine including a supercharger, a fuel-injector, an accelerator opening detector, an actual supercharging pressure detector, and a powertrain control module (PCM), the method comprising:

detecting a degree of opening of an accelerator pedal through the accelerator opening detector;

detecting an actual supercharging pressure through the actual supercharging pressure detector; and controlling an injection mode of the fuel-injector, via the PCM, to execute:

main injection for injecting fuel via the fuel-injector near a compression top dead center;

pilot injection for injecting fuel via the fuel-injector, which is executed prior to injecting fuel via the fuel-injector, being based on an operating state of the diesel engine; and if the degree of opening of the accelerator pedal decreases during operation of the supercharger, and the actual supercharging pressure is determined to be equal to or higher than a predetermined value, allowing an interval between a start timing of the pilot injection and a start timing of the main injection, during a cylinder pressure control, to be broader than an interval between a start timing of the pilot injection and a start timing of the main injection during a regular control that is executed if the actual supercharging pressure is determined to be less than the predetermined value, wherein the control method further includes setting a fuel injection amount in the pilot injection, with executing the cylinder pressure control to be equal to a fuel injection amount without executing the cylinder pressure control.

2. The method of claim 1, wherein
the cylinder pressure control is executed to reach a sufficient amount of time for premixing fuel being supplied by the pilot injection, which is secured without reducing a fuel injection amount, thereby preventing the reducing of torque due to a decrease in the fuel injection amount.

3. The method of claim 1, further comprising:
computing a difference between a target supercharging pressure and the actual supercharging pressure, determining whether or not the difference is equal to or greater than a predetermined reference value, and responsive to determining that the difference is equal to or greater than the predetermined reference value, executing the cylinder pressure control.

4. A diesel engine comprising:
a supercharger:
a fuel-injector;
an accelerator opening detector that detects a degree of opening of an accelerator pedal;
an actual supercharging pressure detector; and
a powertrain control module (PCM) including executable instructions stored on a non-transitory memory for:
determining an operating condition of the diesel engine;
controlling an injection mode of the fuel-injector to allow main injection being started near a compression top dead center and pilot injection being executed prior to the main injections; and
based on decreasing the degree of opening of the accelerator pedal during operation of the supercharger, executing a cylinder pressure control, if an actual supercharging pressure detected with the actual supercharging pressure detector is equal to or higher than a predetermined value, to allow an interval between a start timing of the pilot injection and a start timing of the main injection being broader than the interval between the start timing of the pilot injection and the start timing of the main injection than if the actual supercharging pressure is less than the predetermined value, wherein the PCM further includes executable instructions to set a fuel injection amount in the main injection with executing the cylinder pressure control, to be equal to a fuel injection amount without executing the cylinder pressure control.

5. The diesel engine of claim 4, wherein
the PCM further includes executable instructions to broaden the interval between a start timing of the pilot injection and a start timing of the main injection by retarding the start timing of the main injection as compared to the interval between a start timing of the pilot injection and a start timing of the main injection if the actual supercharging pressure is less than the predetermined value during executing the cylinder pressure control.

6. The diesel engine of claim 4, wherein
the cylinder pressure control is not executed even if the actual supercharging pressure is equal to or higher than the predetermined value, when the degree of opening of the accelerator pedal decreases during the operation of the supercharger and a fuel injection amount in the pilot injection is less than a predetermined amount.

7. The diesel engine of claim 4, wherein
the supercharger is configured as a turbocharger including a turbine and a compressor, the turbine being provided in an exhaust passage of the diesel engine, the compressor being provided in an intake passage of the diesel engine and configured to rotate in synchronization with the turbine via a shaft.

8. The diesel engine of claim 4, wherein
the PCM further includes executable instructions to compute a difference between a target supercharging pressure and the actual supercharging pressure, determine whether or not the difference is equal to or greater than a predetermined reference value, and responsive to determining that the difference is equal to or greater than the predetermined reference value, execute the cylinder pressure control.

9. A diesel engine comprising:
a supercharger:
a fuel-injector;
an accelerator opening detector that detects a degree of opening of an accelerator pedal;
an actual supercharging pressure detector; and
a powertrain control module (PCM) including executable instructions stored on a non-transitory memory for:
determining an operating condition of the diesel engine;
controlling an injection mode of the fuel-injector to allow main injection being started near a compression top dead center and pilot injection being executed prior to the main injection;
based on decreasing the degree of opening of the accelerator pedal during operation of the supercharger, executing a cylinder pressure control, if an actual supercharging pressure detected with the actual supercharging pressure detector is equal to or higher than a predetermined value, to allow an interval between a start timing of the pilot injection and a start timing of the main injection being broader than the interval between the start timing of the pilot injection and the start timing of the main injection than if the actual supercharging pressure is less than the predetermined value, wherein the PCM further includes executable instructions to set a fuel injection amount in the pilot injection, with executing the cylinder pressure control to be equal to a fuel injection amount without executing the cylinder pressure control.

10. The diesel engine of claim 9, wherein the PCM further includes executable instructions to compute a difference between a target supercharging pressure and the actual supercharging pressure, determine whether or not the difference is equal to or greater than a predetermined reference value, and responsive to determining that the difference is equal to or greater than the predetermined reference value, execute the cylinder pressure control.

\* \* \* \* \*